Sept. 15, 1931.  I. N. JORDAN  1,823,149
MEAT SMOKING HANGER
Filed July 29, 1929

WITNESSES:
R. A. Larsson
F. C. Appleton

INVENTOR:
ISAAC N. JORDAN,
By Joshua R. H. Potts
HIS ATTORNEY.

Patented Sept. 15, 1931

1,823,149

UNITED STATES PATENT OFFICE

ISAAC N. JORDAN, OF CHICAGO, ILLINOIS, ASSIGNOR TO ARMOUR AND COMPANY, OF CHICAGO, ILLINOIS, A CORPORATION OF ILLINOIS

MEAT SMOKING HANGER

Application filed July 29, 1929. Serial No. 381,803.

This invention relates to meat smoking hangers. In the means existing prior to this invention for hanging meat during smoking, hooks, puncturing combs and similar devices have been and are being used. These devices cause relatively deep cuts or punctures in the meat, bacon, etc. and result in vast mutilation and injury thereto. As a result of such mutilation, a large percentage of meat is rejected or classed in a lower grade, whereas if the mutilation had been avoided, said percentage of rejected meat would be saved.

Many devices have been urged as remedies for the disadvantages hereinabove set forth, but until the present invention, no satisfactory device had been produced which would suitably and expeditiously hold and hang in all positions whatsoever meat, bacon and other bodies or substances.

One of the objects of the present invention is to provide an improved device of this character whereby meat, bacon, etc. may be suitably and expeditiously hung for smoking purposes, etc. without cutting, hooking or otherwise mutilating the meat, bacon, etc.

Other objects and advantages will appear hereinafter.

The invention consists in the parts and combinations and arrangements of parts hereinafter described and claimed.

The invention will be best understood with reference to the accompanying drawings forming a part of this specification and in which.

The device of the invention may be utilized to advantage particularly in connection with holding any body or substance of a compressible nature. Any one device, because of its resiliency, may accommodate bodies within a certain range of sizes, and with respect to bodies below and beyond such certain range of sizes, the device may be enlarged proportionately in all its members to accommodate a body of any size whatsoever.

Figure 1:
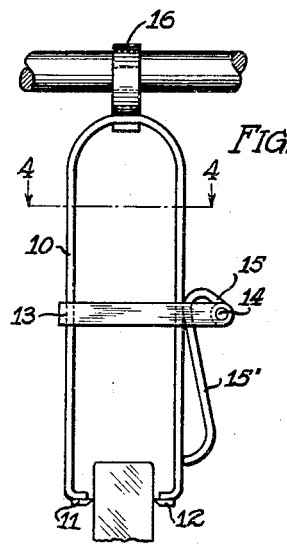
Fig. 1 is a side view of the device showing the position of the same when holding a substance and hanging.
Figure 2:
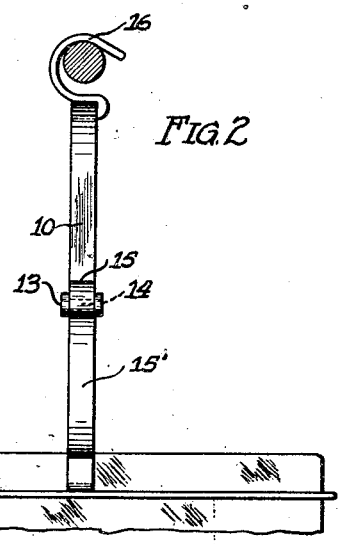
Fig. 2 is a view of the device taken at right angles but under the same conditions as presented in Fig. 1.
Figure 3:
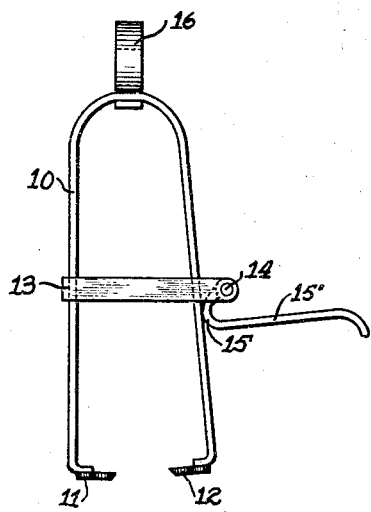
Fig. 3 is a side view of the device preparatory to inserting a body between the holding members and springing the compressing member.
Figure 5:
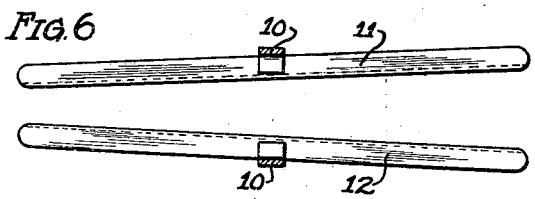
Fig. 5 is a top view of the clamping members illustrating alternative edges.
Figure 6:
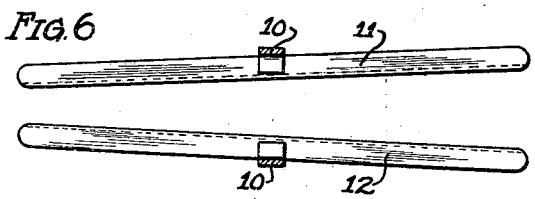
Fig. 6 is a top view of clamping members illustrating additional alternative edges, which in this view are beveled plainly without teeth or lugs of any kind.

The preferred embodiment as illustrated in Fig. 2 is particularly adapted to a meat hanger, and more particularly for holding the meat while being smoked or dried. The device as shown, consists of a U-shaped frame 10 with ends turned inwardly and toward each other. By any suitable means there is affixed to each of the turned in extremities of the frame 10, an elongated bar or clamping member with a beveled edge, said clamping members being affixed in a manner transversely of the legs of the frame. The two clamping members which are designated by the numerals 11 and 12 are opposed to each other but not necessarily parallel, but, for a purpose hereinafter described, the two clamping members in the preferred form are spaced slightly farther apart at one end than at the other, as illustrated in Figs. 4, 5, and 6, this arrangement depending upon the nature of the material with which the hanger is to be used and more particularly pieces or strips of bacon which are invariably thicker at one side.

Figure 4:
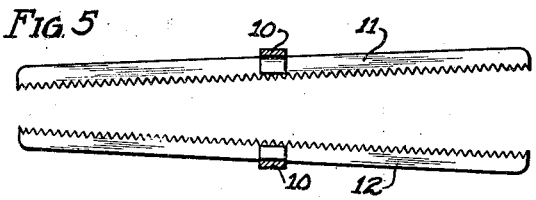
Fig. 4 is a section, taken on the line 4—4 of Fig. 1, showing the device in position after the pressing member has been sprung.

The clamping members in the preferred form, as shown in Fig. 4, have toothed lugs 17 and these lugs are beveled downwardly or undercut on their opposed edges so that when the clamping members are in operation, the top edge portion of each clamping member is the first to come in contact with the inserted substance whereby to more securely hold said substance.

Affixed by any suitable means to one leg of the U-shaped frame 10 and extending across its center and straddling the opposite leg of the frame, is a yoke 13 which is united at its open end by a bolt 14 forming a hinge. Rotatable on the bolt or hinge 14 is a cam 15, said cam having a handle extension 15' for manipulating it. When the device is in a relaxed condition the cam 15 is in a downward position with the handle portion 15' thereof projecting horizontally outward. When the device is in a locked condition, the cam is moved inward to a position above dead center and the handle is in a depending vertical position and lies close against the adjacent leg of the frame.

At the very top and center of the loop of the U-shaped frame 10 there is attached, by any suitable means, a hook 16.

The operation of the device is as follows:
The body or substance to be hung is inserted between the clamping members 11 and 12, and when satisfactorily adjusted between the said clamping members 11 and 12, the handle 15' of the cam 15 is pressed downwardly and inwardly to a vertical position. This causes the cam 15 to move inwardly and upwardly against the adjacent leg of the U-shaped frame 10. This movement, because of the pressure exerted by the cam 15, causes the said adjacent leg of the said frame 10 to be compressed toward the other leg of the frame.

The pressure on the leg of the frame adjacent to the cam 15 is transmitted to the clamping member 12 affixed to the extremity thereof, which clamps the interposed substance to be hung against the clamping member 11 on the other side thereof, whereby the substance is securely grasped and held thereby between said clamping members. When the handle of the cam 15 has been moved as far downwardly and backwardly against the adjacent leg of the frame 10, the cam and the entire device will remain firmly fixed or locked until the pressure is relaxed by moving the handle of the cam 15 outwardly and upwardly. With the substance inserted between the clamping members held thus firmly fixed and hung, the whole device and the inserted substance may be hung upon any suitable bar or supporting element by means of the hook 16. Alternative clamping members are shown in Figs. 5 and 6. In one of these modifications, the clamping members are serrated or toothed throughout the entire length of the substance engaging edges thereof, while in the other modification said edge portions are plain and merely beveled.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In combination, a meat smoking hanger having a resilient frame in the form of an inverted U, indenting means at the extremity of the said frame for engaging a body inserted between the said extremities by compression, said indenting means including two elongated bars one of which is attached to one of the extremities of said frame and the other being attached to the other extremity of the said frame, the bars being affixed in such a manner that they are opposed to each other so as to engage a body inserted between them, said bars being slightly farther apart at one end than the other, said indenting bars having means thereon for contacting the engaged body, a yoke across said frame, a cam attached to said yoke so as to exert pressure on one side of the frame, and a hook attached to said frame, substantially as described.

2. In a meat smoking hanger, a slender frame substantially in the form of an inverted U, indenting means at the extremities of the said frame for engaging a body inserted between the said extremities by compression, said indenting means including two slender elongated bars one of which is attached to one of said extremities and the other to the second of said extremities in order to permit said bars to function in a yieldable manner, the bars being affixed in such a manner that they are opposed to each other so as to engage a body inserted between them when pressure is applied, said bars being slightly farther apart at one end than at the other, said indenting bars having beveled edges for contacting the engaged body, means for compressing said bars toward each other, said means including a yoke around said frame and a cam attached to said yoke so as to afford pressure on one side of the frame in the direction of the other side, and means on said hanger to enable the same to be hung up substantially as described.

3. In a meat smoking hanger, a slender frame substantially in the form of an inverted U, indenting means at the extremities of the said frame for engaging a body inserted between the said extremities by compression, said indenting means including two slender elongated bars one of which is attached to one of the said extremities and the other to the second of said extremities in order to permit said bars to function in a yieldable manner, the bars being affixed in such a manner that they are opposed to each other so as to engage a body inserted between them when pressure is applied, said bars being slightly farther apart at one end than at the other, said indenting bars having teeth therein for contacting the engaged body, means for compressing said bars toward each other, said means including a yoke around said frame and a cam attached to said yoke so as to afford pressure on one side of the frame in the direction of the other side, and means on said hanger to enable the same to be hung up substantially as described.

In testimony whereof, I have signed my name to this specification.

ISAAC N. JORDAN.